United States Patent [19]
Harnish et al.

[11] 3,715,435
[45] Feb. 6, 1973

[54] PHENYLAZOALKENOATE FUNGICIDAL COMPOSITIONS

[75] Inventors: Wayne N. Harnish, Medina; Robert E. Sticker, Middleport; Glen A. Carls, Williamsville, all of N.Y.

[73] Assignee: FMC Corporation, New York, N.Y.

[22] Filed: Aug. 21, 1970

[21] Appl. No.: 66,106

[52] U.S. Cl. ................................................. 424/226
[51] Int. Cl. .................................................. A01n 9/20
[58] Field of Search .............. 424/226; 260/149, 192

[56] References Cited

OTHER PUBLICATIONS

Chemical Week, April 26, 1969, page 63.
Chem. Abst., Vol. 33, pp. 4211–4212 (1939).
Van Alphen, Rec. Trav. Chim. 64, pp. 109–114 (1945).
Van Alphen, Rec. Trav. Chim. 64, pp. 305–308, (1945).
Chem. Abst., Vol. 51, pp. 15,500–15,501 (1957).
Chem. Abst. 49, 8302c (1955), Dornow et al.

*Primary Examiner*—Albert T. Meyers
*Assistant Examiner*—Allen J. Robinson
*Attorney*—Henry Robinson Ertelt, Eugene G. Seems and Pauline Newman

[57] ABSTRACT

As new fungicidal compositions, substituted phenylazoalkenoates of the general formula

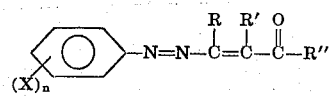

wherein R is hydrogen or lower alkyl, R' is hydrogen or chlorine; R" forms an ester or an amide; X is an electronegative substituent such as nitro, cyano, methylsulfonyl, carboxyl, or COOM where M is a metal cation; $n$ is 1 or 2; and the substituents X may be the same or different when $n$ is 2, and are in the ortho or para positions on the ring. The preparation and physical and fungicidal properties of preferred members of this class are described in detail.

16 Claims, No Drawings

PHENYLAZOALKENOATE FUNGICIDAL COMPOSITIONS

BACKGROUND OF THE INVENTION

Plant diseases caused by pathogenic organisms such as fungi have been known for many years. Many fungal diseases still remain uncontrolled or inadequately controlled, and much effort has been expanded and continues to be expended in the search for chemical means capable of providing more effective control of these diseases.

The term "fungicidal" includes not only the property of destroying fungi, but also the property of inhibiting the germination of the spores of fungi. The difficulty in finging effective plant fungicides resides in the innate nature of these pathogenic organisms: their small size enables them to penetrate minute wounds or natural openings in plant tissues, their power of propagation allows them to become established rapidly and to spread rapidly, and they may be disseminated widely by wind, rain, irrigation water, and on seeds, tubers, and other propagative parts of plants.

DESCRIPTION OF THE PRIOR ART

Certain compounds related to the active class of chemicals described herein have previously been synthesized, but the literature contains no suggestion that these compounds or related compounds have fungicidal activity. See Van Alphen, Rec. Trav. Chim. 64, 109 and 305 (1945); and Dornow et al. Chem. Abstracts 49, 8302c (1955). In addition, certain compounds related to this active class of fungicides have previously been reported to be effective miticides, in commonly owned U.S. Pat. applications, Ser. No. 712,351 filed Mar. 12, 1968, now abandoned, Ser. No. 777,200 filed May 19, 1968, now abanconed, and Ser. No. 20,839 filed Mar. 18, 1970, now U.S. Pat. No. 3,651,226 issued Mar. 21, 1972.

SUMMARY OF THE INVENTION

We have now discovered that certain phenylazoalkenoates are useful and effective agents for the control of plant fungal diseases. These chemicals provide long-lasting protection to seeds, seedlings and growing plants, and exhibit an unusually broad spectrum of activity, such that control of several different fungal diseases may be obtained.

DETAILED DESCRIPTION

The phenylazoalkenoates of this invention have the formula

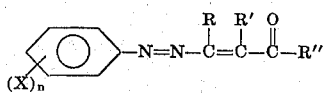

wherein R is hydrogen or lower alkyl; R' is hydrogen or chlorine; R'' is lower alkoxy, lower alkylamino, or lower dialkylamino; X is an electronegative substituent in the ortho and/or para position, such as nitro, cyano, methylsulfonyl, carboxyl, or -COOM where M is a metal cation or a quaternary amine; and n is 1 or 2. The substituents X may be the same or different when n is 2.

In certain preferred fungicidal compositions, X is nitro and is in the para position; n is 1; R is methylp R' is hydrogen; and R'' is an alkoxy or alkyl- or dialkylamino group where each alkyl group contains one to four carbon atoms. Thus this preferred class of phenylazo-2-butenoates has the formula

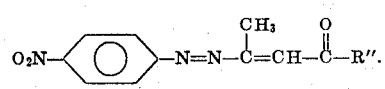

Useful aliphatic groups for the substituents at R'', bonded through oxygen to esters, or through nitrogen to form the mono- or di-amides, include methyl, ethyl, propyl, isopropyl, propenyl, butyl, sec-butyl, isobutyl, tert-butyl, propynyl, 2-butynyl, ω-butynyl, pentyl, neopentyl, and other straight and branched-chain, saturated and unsaturated, aliphatic groups, which may also contain ether linkages in the chain and other substituents. The precise nature of the group at R'' is not critical, we have found, as compared with the basic phenylazoalkenoate moiety

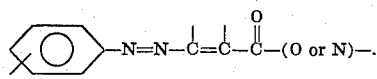

Where this basic, albeit complex, molecular structure is present, a wide variety of substituents may be present — and such sbustituents do have a general effect on the degree of fungicidal effectiveness — but without detracting from the basic fungicidal activity contributed by the nuclear structure of the phenylazoalkenoate.

By application of an effective amount and concentration of the active agents described herein to the situs of growing plants, useful and economically important control of plant diseases caused by many plant-pathogenic fungi can be obtained, including but not limited to the following genera of fungi: *Piricularia, Uromyces, Venturia, Colletotrichum, Phytophthora, Fusarium, Verticillium, Erysiphe, Helminthosphorium, Alternaria, Cercospora,* and *Dipoldia*, which cause diseases such as rice blast, bean rust, brown spot of rice, apple scab, late and early blight of tomatoes and potatoes, mildews, and many other fungal diseases.

SPECIFIC EXAMPLES

The preparation of representative compounds of this invention, and their fungicidal properties, are shown in the following examples, which are illustrative but not limitative of the invention. All temperatures are in degrees centigrade.

EXAMPLE 1

Synthesis of Methyl 3-[(p-nitrophenyl)azo]-2-butenoate

To 116 g of methyl acetoacetate which has been chilled to 0° was added 135 g of sulfuryl chloride at a rate that the temperature never exceeded 5°. Stirring was continued at room temperature for about 16 hours. The reaction mixture was diluted with 300 ml of ether, and the ethereal solution was washed with water, saturated sodium bicarbonate solution, and water. The ether solution was dried (MgSO$_4$). Ether was removed by distillation, and the residue was distilled under reduced pressure to give 74.5 g of methyl 2-chloroacetoacetate; bp = 85°–85°/21–22 mm Hg; $N_D^{25}$ = 1.4574. The product was further characterized by its infrared spectrum.

To a suspension of 7.6 g of p-nitrophenylhydrazine in 120 ml of ethanol was slowly added 2.6 ml of concentrated sulfuric acid. To this mixture was added 100 ml of water, and the mixture was stirred for 15 minutes. The mixture was filtered, and 7.76 g of methyl 2-chloracetoacetate in 10 ml of ethanol was added. The reaction mixture was stirred for one-half hour and then chilled. The precipitated product was collected by filtration and washed with 50 percent aqueous-ethanol and with water. The product was recrystallized twice from ethanol to give 8.9 g of methyl 3-[(p-nitro-phenyl)azo]-2-butenoate; mp = 118°–119.5°. The identity of the product was verified by its infrared and nuclear magnetic resonance (nmr) spectra.

Analysis: Calc'd for $C_{11}H_{11}N_3O_4$: C 53.01; H 4.45; N 16.86.

Found: C 52.86; H 4.33; N 16.93.

EXAMPLE 2

Spore Germination Studies

Spore germination studies were conducted as follows:

One-tenth milliliter of acetone solution containing 0.04 mg (4 ppm) of the compound being tested was placed in the depression of a hanging-drop microscope slide. The solvent was allowed to evaporate at room temperature, and then 0.1 ml of a suspension of spores in potatoe-dextrose broth was added to the chemically treated depression. A petroleum jelly-ringed cover slip was placed over the slide well and the spore suspension incubated under continuous low-intensity light at 20° for 18 hours. The percent germination of the spores was rated on a scale of 0 to 4, in comparison with an untreated control, as follows:

0 = no germination
1⁻ = 1–10% of untreated
1 = 15–45% of untreated
2 = 50% of untreated
3 = 55–75% of untreated
4 = essentially equal to untreated.

Various commercially available fungicides were used as standards for comparison. The standards selected were those known to provide effective control of the fungal organism tested. Standards included captan, benomyl, dodine, and Polyram (a mixture of ammoniates of [ethylenebis(dithiocarbamato)]zinc with ethylenebis(dithiocarbamic acid) cyclic sulfides [Fed. Reg. 35, 8929 (1970)].) The results obtained using methyl 3-[(p-nitrophenyl)azo]-2-butenoate are presented in Table 1.

TABLE 1

Spore Germination Studies in vitro Fungicidal Efficacy of Methyl 3-[(p-nitrophenyl)azo]-2-butenoate

| Organism | Rating Test Compound | Standard Rating | Identity |
|---|---|---|---|
| Alternaria solani (early blight) | 0 | 2 | captan |
| Botrytis cinerea (gray mold) | 0, 1⁻ | 0 | captan |
| | | 4 | benomyl |
| Ceratocystis ulmi (Dutch elm disease) | 0 | 0 | captan |
| Colletotrichum lagenarium (anthracnose) | 0 | 0 | captan |
| Diplodia zeae (stalk rot of corn) | 0 | 0 | captan |
| Fusarium oxysporum (wilt of tomato) | 0 | 0 | captan |
| | | 4 | benomyl |
| Monilia fructicola (brown rot) | 0 | 0 | captan |
| Piricularia oryzae (rice blast) | 0 | 0 | captan |
| Ulocladium atrum | 0, 1⁻ | 1, 0 | captan |
| | | 4 | benomyl |
| Uromyces phaseoli (bean rust) | 0 | 0 | Polyram |
| Venturia inaequalis (apple scab) | 0, 1 | 0, 1⁻ | captan |
| | | 0, 1⁻ | dodine |
| Verticillium albo-atrum (cotton Defoliation wilt) | 0 | 0 | captan |
| | | 1 | benomyl |

These results show that the test compound is as effective as captan, Polyram, and dodine in these tests, all widely used commercial products, and more effective than benomyl. The range of effectiveness of this test compound is unusually broad.

EXAMPLE 3

Studies of Foliar Fungicidal Activity

The procedures employed for evaluation of foliar fungicidal activity of the azoalkenoates were as follows:

A. Late blight and early blight

A suspension of 210 mg of a 25 percent wettable powder formulation of the test compound is 350 ml of water was prepared. The aqueous suspension of the test compound was applied to 4-week-old tomato plants, *Lycopersicon esculentrum*, by means of two stationary atmosizing nozzles operating at 20 p.si.i., one nozzle being directed from above the plant foliage, the other from below the plant foliage. During spraying, the plants were rotated on a turntable and the aqueous suspension was continually stirred. The following day, the chemically treated plant was sprayed with a suspension of zoospores (100,000/ml) of *Phytophthora infestans* (causal agent of late blight) or of conidia (80,000/ml) of *Alternaria solani* (causal agent of early blight) for one minute using 20 p.s.i. pressure. The tomato plant was then placed in a humidity chamber, which was maintained at 17 ± 1' and 100 percent relative humidity, for 3 to 4 days. The percent control of the late or early blight, relative to plants infected but not chemically treated, was recorded.

The test compound methyl 3-[(p-nitrophenyl)azo]-2-butenoate was formulated as a 25 percent wettable powder by mixing with 72 percent by weight of attapulgite clay, 1.5 percent by weight of purified sodium lignosulfonate, and 1.5 percent by weight of sodium alkyl-naphthalenesulfonate. The formulation was air-milled prior to dispersion in water. It was found that air-milling, or alternate methods of obtaining uniform dispersal on the leaves, was necessary to obtain reproducible and effective test results. Activity of methyl 3-[(p-nitrophenyl)azo]-2-butenoate against late blight and early blight is shown in Table 2.

Bean rust

Following the procedure described above for treatment of the tomato plant, a pinto bean plant, *Phaseolus vulgaris*, at the bifoliate stage, was sprayed with an aqueous suspension of the test compound. The following day, a 2 percent spore power, comprising urediospores of *Uromyces phaseoli* admixed with Pyrax ABB (a low-absorptive diluent characterized as a hydrous aluminum silicate of the pyrophyllite class), was dusted onto the leaves of the plant. The treated bean plant was placed in the humidity chamber for 24 hours, then transferred to the greenhouse until disease symptoms developed, usually 3 to 4 days. The percent control of bean rust, relative to plants infected but not chemically treated, was recorded. Results of treatment with methyl 3-[(p-nitrophenyl)azo]-2-butenoate are shown in Table 2.

C. Bean mildew

Following the procedure described for bean rust, a bush bean seedling, *Phaseolus vulgaris*, was sprayed with an aqueous suspension of the test compound. The following day, the seedling was infected with *Erysiphe polygoni* (causal organism of bean mildew) by shaking diseased leaves over the test plant. The test plant was maintained in the greenhouse for 1 week, after which time the percent control of bean mildew, relative to plants infected but not chemically treated, was recorded. Results of treatment with methyl 3-](p-nitrophenyl)azo]-2-butenoate are shown in Table 2.

D. Rice blast

Following the same procedure, a stand (60–80 plants in a 2-inch pot) of rice, *Oryzae sativum*, in the three-leaf stage was sprayed with an aqueous suspension of the test compound. The following day, the stand of rice was sprayed with an aqueous suspension of conidia (150,000/ml) of *Piricularia oryzae* (International Race Group ID, Race 8; causal organism of rice blast) containing 5 drops/750 ml of 8 percent Triton X-100 (an emulsifier-wetting agent characterized as an octylphenoxy-polyethoxyethanol). The plants were held in the humidity chamber for 1 day, then transferred to the greenhouse until disease symptoms developed, usually 3 to 4 days. The present control of rice blast, relative to plants infected but not chemically treated, was recorded, Results of treatment with methyl 3-[(p-nitrophenyl)azo]-2-butenoate are shown in Table 2.

An important and valuable attribute of the compounds of this invention is that in general they control more than one plant disease. Many commercially available fungicides provide more limited control, or are specific for one plant disease. Thus it is often necessary to use more than one fungicide, in combination, to control fungal diseases of a particular agricultural crop. Many species of the class of compounds of this invention have shown activity o f each of the four classes of fungi, *Deuteromycetes*, *Ascomycetes*, *Phycomycetes*, and *Basiomycetes*.

TABLE 2

Foliar Fungicidal Efficacy of Methyl 3-[(p-nitrophenyl)azo]-2-butenoate

| Disease | Percent control | |
|---|---|---|
| | 600 ppm | 300 ppm |
| Late Blight | | 86 |
| Bean rust | 100 | |
| Bean Mildew | 100 | |
| Rice Blast | | 92 |

EXAMPLE 4

Field Tests of Fungicidal Activity

A wettable powder formulation was prepared by blending 25.25 parts of methyl 3-[(p-nitrophenyl)azo]-2-butenoate, 1.00 part of sodium alkylnaphthalenesulfonate, 2.00 parts of sodium lignosulfonate, and 71.75 parts of attapulgite clay. This mixture was air-milled to give a powder of which 99.94 percent passed through a 325 mesh screen. This powder was mixed with water to a concentration equivalent of 1.6 pounds of methyl 3-[(p-nitrophenyl)azo]-2-butenoate per 100 gallons of water. Following a period of conditions conducive to apple scab (causal agent *Venturia inaequalis*) infection, eight apply trees (four McIntosh variety, four Jonathan variety) were sprayed with a volume of the spray composition sufficient that all leaves were dripping wet. A similar set of eight trees were sprayed with an aqueous dispersion (1.6 pounds of active ingredient per 100 gallons) of Polyram. Eleven days later, the trees were sprayed as before except that 0.5 pound per 100 gallons of the commercial product binapacryl was added to the olyram spray. At least three infection periods occurred during the 11-day interval. Twenty-one days after the original treatment, a third application was made identical to the second.

Five days after the final treatment, readings were made of the incidence of apple scab on the McIntosh trees and of apple mildew (causal agent *Podosphaear leucotricha*) on the Jonathan trees. The readings were made by counting the scab lesions in each of 10 randomly selected terminals on each of the McIntosh trees. Similarly, 25 terminals per Jonathan tree were counted to determine the incidence of apple mildew. Results of this test are summarized in Table 3. These results show that methyl 3-[(p-nitrophenyl)azo]-2-butenoate gave outstanding control of apple scab and apple mildew under field conditions. The control of apple scab was as good as that obtained with the scrong Polyram-binaparcyl treatment, and the control of apple mildew was even better than that obtained with this preferred product mix. Neither Polyram nor binapacryl alone provides adequate protection against both of these coommon diseases of apple trees, Polyram being substantially ineffective against apply mildw and befebinapacryl being substantially ineffective against apply scab. The test compound methyl 3-[(p-nitrophenyl)azo]-2-butenoate alone provided more effective control of both diseases together than did the Polyram-binapacryl combination.

TABLE 3

Field Test Results

| Treatment | No. of Scab Lesions (total from 40 terminals) | Terminals with Mildew (total of 1001 terminals) |
|---|---|---|
| Methyl 3-[(p-nitrophenyl)azo]-2-butenoate | 1 | 1 |
| Polyram-binapacryl | 1 | 21 |
| Untreated | 236 | 49 |

EXAMPLE 5

Methyl 3-[(p-cyanophenyl)azo]-2-butenoate

Following the procedure of Example 1, 5 g of p-cyanophenylhydrazine was reacted with 5.7 g of methyl 2-chloroaceto-acetate to produce a red precipitate. Recrystallization of the red precipitate from ethanol-water gave 4.3 g of methyl 3-[(p-cyanopheynyl)azo]-2-butenoate, mp = 99.5°–100°. The identity of the product was verified by uv and ir spectroscopy. Analysis: Calc'd for $C_{12}H_{11}N_3O_2$: C 62.88; H 4,84; N 18.33.

Found: C 62.98; H 5.05; N 18.08.

When tested according to the procedure of Example 2, methyl 3-[(p-cyanophenyl)azo]-2-butenoate completely inhibited the germination of spores of *Botryties cinereas, Fusarium oxysporum, Piricularia Oryzae, Ulocladium atrum* and *Venturia inaequalis*. When test according to the procedure of Example 3, at 75 ppm it gave 95 percent control of bean resut, 85 percent control of later blight, 91 percent control of rice blast and 99 percent control of early blight.

EXAMPLE 6

N,N-Dimethyl-3-[(p-nitrophenyl)azo]-2-butenamide

A nitrogen atmosphere was maintained over 258.4 g of coiled (5°) N,N-dimethylacetoacetamide while to it was added during 2.5 hours 270.0 g of sulfuryl chloride, the temperature being maintained at 5°–10°. When addition was completed, the cooling bath was removed and the mixture stirred for 18 hours at ambient temperature. The mixture was then heated on the steam bath for 15 mintues to expel hydrogen chloride, cooled to room temperature, and 400 ml of methylene chloride was added. The solution was washed with water, saturated sodium bicarbonate solution, then with water until the wash was neutral. The washed solution was dried (MhSO$_4$), filtered and concentrated under reduced pressure. The residual oil was distilled to give, after removal of a small forerun, 210 g of 2-chloro-N,N-dimethylacetoacetamide, bp = 78°–79°/0.2 mm Hg; $n_D^{26}$ = 1.4840.

To a solution of 5.0 g of p-nitrophenylhydrazine in 100 ml of ethanol was added dropwise 1.7 ml of concentrated sulfuric acid. The mixture was diluted by addition of 100 ml of water, stirred for 15 minutes, then filtered. To the filtrate was added with stirring a solution of 5.3 g of 2-chloro-NN,-dimethyl-acetoacetamide in 40 ml of ethanol. The mixture was stirred for 1 hour, then chilled in an ice bath. The red solid was collected by filtration, then dissolved in a 1:3 mixture of ethyl acetate and hexane, and purified by column chromatography using a silica gel column (Florisil) and ethyl acetate-hexane as eluting solvent. The first 125 ml of eluted solution was discarded. The next 775 ml eluted was concentrated and the residula solid recrystallized from ethanol to give 1.39 g of dark red N,N-dimethyl-3-[(p-nitrophenyl)-azo]-2-butenamide; mp = 147°–149°. The structure was verified by irspectroscopy.

Analysis: Calc'd for $C_{12}H_{14}N_4O_3$: C 54.95; H 5.38; N 21.36.

Found: C 55.17; H 5.53; N 21.32.

In in vitro tests (Example 2), N,N-dimethyl-3-[(p-nitro-phenyl)azo]-2-butenamide completely inhibited germination of *Botrytis cinerea, Fusarium oxysporum, Piricularia oryzae, Verticillium albo-atrum* and *Venturiz inaequalis*, and reduced germination of *Ulocladium atrum* to less than half that of the untreated.

In foliar tests (Example 3), it gave complete control of bean rust at 150 ppm and 91 percent control of rice blast at 75 ppm, but did not control bean mildew or late blight.

EXAMPLE 7 I tert-Butyl 3-[(p-nitrophenyl)azo]-2-butenoate

To a solution of 17.8 g of N-bromosuccinimide in 270 m 1 of carbon tetrachloride under a nitrogen atmosphere was slowly added, during stirring, 15.8 g of tert-butyl acetoacetate. Stirring was continued at room temperature for about 16 hours. The reaction mixture was filtered, and the filtrate washed with water and dried (MgSO$_4$-Na$_2$SO$_4$). Solvent was removed and the residual oil was distilled, under reduced pressure, to give 16.85 g of tert-butyl 2-bromoacetoacetate; bp = 54.5°–57.5°/0.3 mm hg; $n_D^{25}$ = 1.4538–1.4540.

To a chilled (5°) mixture of 2.65 g of p-nitrophenylhydrazine in 25 ml of ethanol and 1.6 g of sodium acetate in 10 ml of water was added a cold solution of 4.03 g of tert-butyl 2-bromoacetoacetate in 10 ml of ethanol. The mixture was warmed until all the solid was in solution and the dark red solution was stirred for one hour at ambient temperature. The solid was isolated by filtration and recrystallized from ethanol to give 1.8 of drak red tert-butyl 3-[(p-nitrophenyl)azo]-2-butenoate; mp = 97°–99°. The identity was verified by ir and nmr spectroscopy.

Analysis: Calc'd for $C_{14}H_{17}N_3O_4$: C 57.73; H 5.88; N 14.42.

Found: C 57.79; H 6.14 N 14.44.

In in vitro tests (Example 2), tert-butyl 3-[(p-nitrophenyl)azo]-2-butenoate was not effective, but in foliar tests (Example 3), it gave at 150 ppm complete control of bean mildew, 95 percent control of rice blast, and 80 percent control of late blight.

EXAMPLE 8

Methyl 3-[(p-nitrophenyl)azo]-2-hexenoate

A mixture of 50 g of ethyl butyrylacetate and 1.8 g of sodium methoxide in 210 g of methanol was relfuxed for 5 hours. The reaction mixture was adjusted to pH 8 with concentrated hydrochloric acid, and methanol was removed by evaporation at room temperature under reduced pressure. The residue was distilled through a Vigreaux column (vacuum-jacketed) and that material which distilled at 73°–74°/11 mm Hg was collected. Vapor-phase chromatographic analysis indicated 94–96 percent conversion had occurred The distilled material was refluxed with 1.8 g of sodium methoxide in 210 g of methanol for 3 hours. The rection mixture was allowed to stand over night at room temperature, and then solvent was removed and the residue distilled. That material which distilled at 78°–80/10 mm Hg was combined to give 24.0 g of product which was shown by vapor-phase chromatographic analysis to be pure methyl butyrylacetate.

A nitrogen atmostphere was introduced over 24.0 g of methyl butyrylacetate, and 22.3 f of sulfuryl chloride was added dropwise, maintaining the temperature of the reaction mixture at 0°–5° throughout the addition. The reaction mixture was stirred at room temperature for about 18 hours, heated on a steam bath for 15 minutes, then dissolved in 200 ml of dichloromethane. This organic solution was washed with water, with saturated sodium bicarbonate solution, and then with water until the wash remained neutral. The dichloromethane solution was dired (MgSO$_4$), solvent was removed under reduced pressure, and the residue was distilled at 87°–89/ 11 mm Hg to give 20.3 g of methyl 2-chlorobutyrylacetate; $n_D^{25} = 1.4465$.

To 200 ml of an ethanolic solution containing 15.5 g of P-nitrophenylhydrazine was added 5.3 ml of concentrated sulfuric acid in 200 ml of water, maintaining the temperature of the mixture at 0°. The mixture was stirred at 0° for 15 minutes and then filtered. To the filtered solution, at 0°, was added 18.0 g of methyl 2-chlorobutyrylacetate in a small volume of ethanol, and the reaction mixture was stirred for 45 minutes. The supernatant liquid was decnated from the precipitate and the precipitate was dissolved in 200 ml of methylene chloride, the solution was dired (MgSO$_4$), filtered and evaporated to dryness under reduced pressure. The solid residue was dissolved in a small volume of ethyl acetate-hexane (1:9) and applied to a 20 x 4.5 cm neutral alumina column. Product was eluted with 400 ml of ethyl acetate-hexane, collected by evaporation of the eluent and recrystallized twice from ethanol. The product was recrystallized from hexane and then recrystallized from ethanol, and finally sublimed to give a solid which melted at 77°–79°. A 6.1 g quantity of methyl 3-[(p-nitrophenyl)azo]-2-hexenoate was obtained and characterized by ir and nmr spectroscopy.

Analysis: Calc'd for C$_{13}$H$_{15}$N$_3$O$_4$: C 56.31; H 5.45 ; N 15.15.

Found; C 56.34; H 5.19; N 15.23.

In in vitro tests (Example 2), methyl 3-[(p-nitrophenyl)-azo]-2-hexenoate completely inhibited germination of *Venturia inaequalis*, partially inhibited *Piricularia oryzae*, but did not inhibit *Botrytis cinerea*, *Fusarium oxysporum*, *Ulocladium atrum* or *Monilia fructicola*. In foliar tests (Example 3) at 150 ppm, it gave complete control of bean mildew and 95 percent control of rice blast but did not control late blight or bean rust.

EXAMPLE 9

Methyl 3-[(p-nitrophenyl)azo]-2-pentenoate

Following the procedure of Example 8, a mixture of 20 g of ethyl propionylacetate and 0.8 g of sodium methoxide in 250 ml of methanol was reacted to give 7.8 g of methyl propionylacetate; bp = 65°/9 mm Hg; $n_D^{25} = 1.4204$.

Following the procedure of Example 8, 7.6 g of sulfuryl chloride was reacted with 7.4 g of methyl propionylacetate, to give 4.7 g of methyl 2-chloropropionylacetate; bp = 78°–79°/9 mm Hg.

Following the procedure of Example 8, 4.4 g of p-nitrophenylhydrazine in 75 ml of ethanol and 1.5 ml of concentrated sulfuric acid in 75 ml of water were reacted with 4.7 g of methyl 2-chloropropionylacetate. The reaction mixture was extracted with two 200-ml volumes of dichloromethane, and the extracts were dried and concentrated. The residue was dissolved in 20 ml of ethyl acetate-hexane (1:1) and applied to a 12.5 × 4.5 cm neutral alumina column. The column was eluted with 200 ml of ethyl acetate-hexane. Collected product was crystallized with a little ethanol. The product was dissolved in 200 ml of hexane; the organic solution was filtered and solvent was removed under reduced pressure to give 0.88 g of methyl 3-[(p-nitrophenyl)azo]-2-pentenoate; mp = 74°–76°. The product was characterized by ir and nmr sepectra.

Analysis: Calc'd for C$_{12}$H$_{13}$N$_3$O$_4$: C 54.75; H 4.98; N 15.96.

Found: C 54.56; H 4.88; N 15.85.

In foliar tests (Example 3), methyl 3-[(p-nitrophenyl)-azo]-2-pentenoate at 150 ppm gave complete control of bean mildew and 95 percent control of each of lateblight, rice blast and bean rust.

EXAMPLE 10

Ethyl 3-[(p-(methylsulfonly)phenyl)azo]-2-butenoate

A solution of 9.3 g of p-(methylsulfonyl)phenylhydrazine in 75 ml of ethanol was mixed with a solution of 6.8 g of sodium acetate trihydrate in 30 ml of water. This mixture was chilled and added to a cold (5°) solution of 8.3 g of ethyl 2-chloroacetoacetate in 30 ml of ethanol. This reaction mixture was stirred for one hour. The precipitated product was collected by filtration, washed thoroughly with water, then with cold 50 percent aqueous-ethanol. The crude product was recrystallized twice from ethanol to give 4.1 g (organe needles) of ethyl 3-[(p-(methylsulfonyl)phenyl)azo2-butenoate; mp = 105.5°–106.5°. The compound identity was further verified by its ir spectrum.

Analysis: Calc'D for C—H$_{16}$ N$_2$O$_4$S: C 52.68; H 5.44; N 9.46.

Found: C 52.81; H 5.19; N 9.43. I When tested according to the procedure of Example 2, etheyl 3-[(p-(methylsulfonyl)phenyl)azo]-2-butenoate at 4 ppm completely inhibited germination of spores of *Piricularia oryzae* and of *Verticillium albo-atrum*, partially inhibited germination of *Uro myces phaseoli*, but did not inhibit germination of *Botrytis cinerea* or *Fusarium oxysporum*.

When tested according to the procedure of Example 3, it gave, at 150 ppm, 98 percent control of bean rest and 75 percent control of rice blast.

EXAMPLE 11

Methyl 3-[(2,4-dinitrophenyl)azo]-2-butenoate

To a stirred solution of 2,4-dinitrophenylhydrazine in 76 ml of ethanol was added dropwise 1.2 ml of concentrated sulfurci acid. To this solution was slowly added, dropwise during 5 minutes, 3.8 g of methyl 2-chloroacetoacetate in 6.3 ml of ethanol. The reaction mixture was stirred for 50 mintues and then the yellow precipitate of methyl 2-chloroacetoacetate 2,4 -dinitorphenylhydrazone was collected in a filter. The solid was washed with ethanol and with water, and dried.

To a cold (5°) suspension of 3.2 g of this 2,4-dinitrophenylhydrazone in 50 m l of water and 20 ml of ethanol was added dropwise 4 ml of 10 percent aqueous sodium hydroxide. The mixture was stirred for 2 hours and the precipitate wa collected by filtration. The collected solid was dissolved in a (1:4) mixture of etyl acetate and hexane, and the solvent removed by evaporation. The residual solid was extracted with seven 50 ml portions of boiling hexane. The extracts were combined, filtered hot and allowed to cool. The crystalline precipitate was collected by filtration, washed with cold hexane and recrystallized from ethanol to give 0.6 g of methyl 3-[(2,4-dinitrophenyl)azo]-2-butenoate; mp = 129°–131°. The product identity was substantiated by uv, ir and nmr spectroscopy.

Analysis: Calc'd for $C_{11}H_{10}N_4O_6$: C 44.91 H 3.43; N 19.03.

Found: C 44.64; H 3.55; N 18.43.

In in vitro tests (Example 2), methyl 3-[(2,4-dinitrophenyl)azo]-2-butenoate completely inhibited *Fusarium oxysporum*, *Piricularia oryzae*, *Ulocladium atrum*, partially inhibited *Venturia inaequalis*, did not inhibit *Botrytis cinerea*. In foliear studies (Example 3) at 75 ppm, it gave 94 percent control of bean rust and 96 percent control of early blight, but did not control rice blast.

EXAMPLE 12

Methyl 3-[(p-(methylsulfonyl)phenyl)azo]-2-butenoate

A solution of 4.1 g of methyl 2-chloroacetoacetate in 50 ml of ethanol was added to a chilled mixture of 5.0 g of p-(methysulfonyl)phenylhydrazine in 50 ml of ethanol and 2.2 g of sodium acetate in 30 m l of water. The reaction mixture was stirred at ambient temperature for one hour, then chilled in an ice bath and the precipitate collected by filtration. The solid was recrystallized from ethanol to give, after treatment of the solution with activated carbon, 1.3 g of red-orange methyl 3-[(p-(methylsulfonyl)phenyl)azo]-2-butenoate; mp =116°–118°. The structure was verified by ir and nmr spectroscopy.

Analysis: Calc'd for $C_{12}H_{14}H_2O_4S$: C 51.05; H 5.00; N 9.92.

Found: C 50.82; H 5.16; N 9.78.

In in vitro test (Example 2), methyl 3-[(p-(methylsulfonyl)phenyl)azo]-2-butenoate completely inhibited germination of *Fusarium oxysporum*, *Piricularia oryzae* and *Verticillium alboatrum*, *Helminthosporium oryzse* and *Venturia inaequalis*, but did not affect *Botrytis cinerea*. In foliar studies (Example 3), it gave complete control of bean rust at 75 ppm, 95 percent control of rice blast at 150 ppm, and 75 percent control of late blight at 150 ppm.

EXAMPLE 13

Methyl 3-[(p-carboxyphenyl)azo]-2-butenoate

A solution of 10.9 g of methyl 2-chloroacetoacetate in 35 ml of ethanol was added to a cold (5°) mixture of p-hydrazinobenzoic acid in 90 ml of ethanol and 5.0 g of sodium acetate in 35 ml of water. The thick mixture was stirred for 1 ½ hours at ambient temperature, then the precipitate was collected by filtration and washed with water. The solid was recrystallized from acetone. The acetone mother liquor was concentrated by evaporation of the solvent and the residue recrystallized again from acetone. The two products of recrystallization were combined to give 12.0 g of rust-colored crystals of methyl 3-[(p-carboxyphenyl)azo]-2-butenoate, mp = 199°d. The identity was confirmed by ir and nmr spectroscopy.

Analysis: Calc'd for $C_{12}H_{12}N_2O_4$: C 58.06; H 4.86; N 11.28.

Found: C 58.35; H 5.04; N 11.00.

In foliar tests (Example 3), methyl 3-[(p-carboxyphenyl)-azo]-2-butenoate gave at 150 ppm complete control of bean rust and 90 percent control of late blight, but did not control bean mildew or rice blast.

EXAMPLE 14

Methyl 3-[(p-carboxypheyl)azo]-2-butenoate, potassium salt

A mixture of 4.0 g of methyl 3-[(p-carboxyphenyl)azo]-2-butenoate in 100 ml of ethanol and 0.9 g of potassium hydroxide in 50 ml of ethanol was stirred for 15 minutes. The precipitate was isolated by filtartion and dried in a vacuum oven to give 4.1 g of roange potassium alst of methyl 3-[(p-carboxyphenyl)azo]-2-butenoate; mp = 315°d. The identity was confirmed by ir spectroscopy.

In invitro tests (Example 2), the potassium salt of methyd 3-[(p-carboxyphenyl)azo]-2-butenoate completely inhibited germination of *Venturia inaequalis*, partially inhibited *Piricularia oryzae*, but failed to inhibit other species. In foliar studies (Example 3), it gave at 150 ppm complete control of bean rust, 95 percent control of late blight, and 80 percent control of rice blast.

EXAMPLE 15

Methyl 3-[(p-carboxyphenyl)azo]-2-butenoate, triethylamine salt

To 4.0 g of methyl 3-[(p-carboxyphenyl)azo]-2-tutenoate was added in small portions with stirring 1.6 g of triethylamine. One hudnred milliliters of hexane was then added and the mixture stirred for 25 minutes. The orange solid was collected and dried in a vacuum oven to give 3.7 g of the triethylamine salt of methyl 3-[(p-carboxyphenyl)azo]-2-butenoate which softened at 125°, then decomposed at 139°. The identity was confirmed by ir spectroscopy.

In in vitro tests (Example 2), the triethylamine salt of methyl 3-[(p-carboxyphenyl)azo]-2-butenoate completely inhibited germination of VEnturia inaequalis. In foliar studies (Example 3), it gave at 150 ppm 96 percent controof bean rust, 95 percent control of late klight, and 80 percent control of rice blast.

EXAMPLE 16

N-Methyl-3-[(p-nitrophenyl)azo]-2-butenamide

Employing the method of Tieman described in U. S. Pat. No. 3,458,573, a mixture of 31 g of chloral and 23 g of N-methylacetoacetamide in 200 ml of carbon tetrachloride was heated under reflux for 2.5 hours. The reaction mixture was maintained under refrigeration for 3 days, then 100 l of carbon tetrachloride and 30 g of sulfuryl chloride were added. The mixture was stirred for 2 hours, then chilled. The precipitate was collected and dried. The solid was mixed with 100 ml of toluene, the toluene mixture was heated under reflux for 2 hours, then allowed to stand for several hours. The mixture was filtered, the filtrqte concentrated under reduced pressure, and the residual oil was distilled. That material distilling at 110–115°/0.6 mm Hg crystallized to give 19.9 g of N-methyl-2-chloroacetoacetamide, mp = 78°—81°. The identity was verified by nmr spectroscopy.

To 5.09 g of p-nitrophenylhydrazine in 90 ml of ethanol was added 1.77 ml of concentrated sulfuric acid, and then 70 ml of water. The mixture was stirred for an additional 15 minutes and then filtered. To the filtrate was added 5.0 g of N-methyl-2-chloroacetoacetamide in 20 ml of ethanol. The reaction mixture was stirred for 45 minutes, then chilled, and the precipitated product was collected by filtration. The product was recrystallized from ethanol to give 2.04 g of N-methyl-3-[(p-nitrophenyl)-azo]-2-butenamide. The product was characerized by uv, ir and nmr spectroscopy, and a sample was recrystallized for elemental analysis; mp = 183.5°–184°.

Analysis: Calc'd for $C_{11}H_{12}N_4O_3$: C 53.23; H 4.87; N 22.56.

Found: C 53.21; H 4.64; N 22.23.

In in virto tests (Example 2), N-methyl-3-[(p-nitrophenyl)azo]-2-butenamide completely inhbiited germination of *Venturia inaequalis*, and partially inhibited *Piricularia oryzae*. In foliar stuides (Example 3), at 150 ppm it gave nearly complete control of rice blast and bean rust, and 80 percent control of late blight.

EXAMPLE 17

Methyl 3-[(o-nitrophenyl)azo]-2-butenoate

To a stirred mixture of 5.3 g of methyl 2-chloroacetoacetate in 50 ml of ethanol and 5.4 g of sodium acetate trihydrate in 15 ml of water was added 5.4 g of o-nitrophenylhydrazine. The reaction mixture was allowed to stand at room temperature for 24 hours, then chilled, and the crude product was collecdted by filtration and washed with cold 50 percent awueous-ethanol to give 5.6 g of brick-red solid. Four and one-half grams of the crude product was purified by column chromatography using silica gel (0.05 – 0.2 mm Brinkman silica gel in 30 mm O.D. column) with 1:2 chlorofirmhexane as eluent solvent. Progress down the column was followed visually, the broad red band being collected. The solvent mixture (1,250 ml) was removed by evaporation to give 2.5 g of red solid, mp = 86°–87°. Recrystallization from petroleum ether (30°–60°) gave oange needles of methyl 3 -[(o-nitrophenyl)azo]-2-butenoate, mp = 87°–88°. The identify was confirmed by ir and nmr spectroscopy.

Analysis: Calc'd for $C_{11}H_{11}N_3O_4$: C 53.01; H 4.45; N 16.86.

Found: C 53.23; H 4.75; N 16.92.

When tested according to the procedure of Example 2, methyl 3-[(o-nitrophenyl)azo]-2-butenoate gave nearly complete control of *Verticillium albo-atrum* and partial control of *Piricularia oryzae* and *Ulocladium atrum*. When tested according to Example 3, it gave at 150 ppm complete control of late blight and bean rust, and 95 percent control of rice blast.

EXAMPLE 18

Ethyl 3-[(p-nitrophenyl)azo]-2-butenoate

Using the method of Example 16, 7.6 g of p-nitrophenylhydrazine was reacted with 8.3 g of ethyl 2-chloroacetoacetate in the presence of 2.6 ml of concentrated sulfuric acid to give 12.6 g of red solid, mp = 93°–94°. Recrystallization from ethanol gave 9.5 g of ethyl 3-[(p-nitrophenyl)azo]-2-butenoate, mp = 94°–95°.

In in vitro tests (Example 2), ethyl 3-[(p-nitrophenyl)-azo]-2-butenoate completely inhibited germination of *Verticillium albo-atrum*, severly inhibited *Fusarium oxysporum*, *Piricularia oryzae*, and *Venturia inaequalis*, and reduced germination of *Botrytis cinerea* and *Alternaria solani* to approximately half that of the untreated.

In foliar studies (Example 3), it gave at 150 ppm partial control of wheat mildew and not control of late blight or bean rust.

EXAMPLE 19

Ethyl 3-[(m-nitrophenyl)azo]-2-butenoate

Using the procedure of Example 16 but without adding sulfuric acid, 9.5 g of m-nitrophenylhydrazine hydrochloride and 8.3 g of ethyl 2-chloroacetoacetate were reacted to give, after recrystallization from ethanol, 8.8 gg of ethyl 3-[(m-nitrophenyl)-azo]-2-butenoate, mp = 84.5°–85°. The identity was verified by irspectroscopy.

Analysis: Calc'd for $C_{12}H_{13}N_3O_4$: C 54.75; H 4.98; N 15.96.

Found: C 54.96; H 4.98; N 15.97.

In in vitro tests (Example 2), ethyl 3-[(m-nitrophenyl)-azo]-2-butenoate partially inhibited *Piricularia oryzae*, *Verticillium albo-atrum*, and *Venturia inaequalis*. In foliar studies (Example 3), it gave at 150 ppm complete control of bean rust and rice blast.

EXAMPLE 20

Methyl 2-chloro-3-[(p-nitrophenyl)azo]-2-butenoate

Under nitrogen atmosphere, 93.0 g of sulfuryl chloride was added dropwise to 40.0 g of methyl acetoacetate while maintaining the temperature at about 5°. The mixture was stirred for 18 hours at ambient temperature, then heated for 15 minutes on the steam bath. The mixture was cooled, and to it was added 200 ml of methylene chloride. The mixture was washed successively with water, saturated sodium bicarbonate solution, and water until neutral. The solution was dried (MgSO₄), filtered and distilled to give 50.7 g of methyl 2,2-dichloroacetoacetate, bp = 44°–45°/0.09 mm Hg. The structure was confirmed by ir and nmr spectroscopy.

Using the procedure of Example 1, 11.4 g of p-nitrophenylhydrazine was reacted with 13.9 g of methyl 2,2-dichloroacetoacetate to give, after recrystallization from ethanol, 8.4 g of dark-red crystals of methyl 2-chloro-3-[(p-nitrophenyl)azo]- 2-butenoate, mp = 116°–118°. The identity was verified by ir and nmr spectroscopy.

Analysis: Calc'd for $C_{11}H_{10}ClN_3O_4$: C 46.57; H 3.55; N 14.81.

Found: C 46.26; H3.46; N 14.33.

In in vitro tests (Example 2), methyl 2-chloro-3-[(p-nitrophenyl)azo]-2-butenoate completely inhibited *Verticillium albo-atrum and Piricularia oryzae*, gave nearly complete inhibition of *Fusarium oxysporum* and *Venturia inaequalis*, partially inhibited *Ulocladium atrum* and Helminthosporium oryzae, but did not affect *Botrytis cinerea*.

EXAMPLE 21

Methyl 3-[(p-nitrophenyl)azo]-2-propenoate

A solution of 7.7 g of p-nitrophenylhydrazine in 50 ml of dimethylformamide was chilled to 5° under nitrogen atmosphere, and to it was added 6.8 g of methyl 2-chloromalonaldehydate prepared according to the method of Faith (U. S. Pat. No. 2,405,820), followed by 2 drops of concentrated hydrochloric acid. The mixture was stirred for 1 hour, then filtered and 8 ml of water added to the filtrate, whereupon another precipitate was formed and collected. The solid was washed with 50 percent aqueous-ethanol and with water to give, after drying, 5.0 g of brown solid. The solid was extracted with 150 ml of an ethyl acetate-petroleum ether (2:1) mixture and the extract concentrated to give 3.6 g of red-brown crystalline solid. Three grams of the solid was dissolved in 8 ml of chloroform and the solution passed through a silica gel column using chloroform as eluent. That fraction comprising a dispersed red band was collected and the solvent removed to give methyl 3-[(p-nitrophenyl)azo]-2-propenoate which, after two recrystallizations from ethyl acetate, melted at 143°–144°. The identity was confirmed by ir and nmr spectroscopy.

Analysis: Calc'd for $C_{10}H_9N_3O_4$: C 51.07; H 3.86; N 17.87.

Found: C 51.26; H 3.97; N 18.13.

In in vitro tests (Example 2), methyl 3-[(p-nitrophenyl)-azo]-2-propenoate completely inhibited *Fusarium oxysporum*, *Piricularia oryzae* and *Verticillium albo-atrum*, nearly completely inhibited *Ulocladium atrum* and *Botrytis cinerea*, and partially inhibited *Venturia inaequalis*.

The active chemical compounds of the class herein may be prepared by a variety of synthetic procedures. In general, the phenylazoalkenoates of this invention may be prepared by reaction of the appropriate 2-haloacylacetate or 2-haloacylacetamide with the appropriately substituted phenylhydrazine or salt thereof. Obviously the specific reactants and synthetic route selected will be determined by the final product desired.

The substituted phenylazoalkenoates of this invention form effective fungicidal compositions when formulated with any of the relatively inert adjuvants and carriers normally employed for facilitating the dispersion of active ingredients for fungicidal applications, recognizing the fact that the formulation and mode of application of a toxicant may affect the activity of the material in a given application. However, if the formulation permits even distribution of the active ingredients and contact with the infected area, the precise nature of the formulation is not critical. Thus the substituted phenylazoalkenoates of this invention may be formulated as wettable powders, as dusts, as emulsifiable concentrates, as solutions, or as any of several other known types of formulations depending on the desired mode of application. These formulations may contain as little as 0.5 percent to as much as 95 percent or more by weight of active ingredient.

Wettable powders are in the form of finely divided particles which disperse readily in water or other dispersant. The wettable powder is ultimately applied either as a dry dust or as a suspension in water or other liquid. Typical carriers for wettable powders include fuller's earth, kaolin clays, silicas or other readily wet organic or inorganic diluents. Wettable powders normally are prepared to contain about 5–95 percent of active ingredient, depending on the absorbency of the carrier, and usually also contain a small amount of a wetting or dispersing agent. For example, a useful wettable powder formulation contains 25.0 parts of the alkenoate, 72.0 parts of Attaclay, and 1.5 parts of sodium lignosulfonate and 1.5 parts of sodium alkyl-naphthalenesulfonate as wetting agents.

Dusts are free-flowing admixtures of the active ingredient with finely divided solids such as talc, natural clays, kieselguhr, fOURS SUCH AS WALNUT SHELL AND COTTON SEED FLOURS, AND OTHER ORGANIC AND INORGANIC SOLIDS WHICH ACT AS DISPERSANTS AND CARRIERS FOR THE TOXICANT: THESE FINELY DIVIDED SOLIDS HAVE AN AVERAGE PARTICLE SIZE OF LESS THAN ABOUT %) MICRONS. A typical dust formulation, useful herein, is one containing 1.0 part of the alkenoate and 99.0 parts of talc.

Emulsifiable concentrates are homogeneous liquid or paste compositions which are dispersible in water or other dispersant, and may consist entirely of the alkenoate with a liquid or solid emulsifying agent, or may also contain a liquid carrier, such as xylene, heavy aromatic naphthas, dimethyl sulfoxide, isophorone, and other nonvolatile organic solvents. For application, these concentrates are dispersed in water or other liquid carrier, and normally applied as a spray to the area to be treated. The percentage by weight of the essential active ingredient may vary according to the manner in which the composition is to be applied, but in general comprises 0.5–95 percent of the fungicidal composition.

Other useful formulations for fungicidal applications include simple solutions of the active ingredient in dispersant in which it is completely soluble at the desired concentration, such as acetone, alkylated naphthalenes, xylene, or other organic solvents.

Typical wetting, dispersing, or emulsifying agents used in agricultural formulations include, for example, the alkyl and alkylaryl sulfonates and sulfates and their sodium salts; polyhydric alcohols; and other types of surface-active agents, many of which are available in commerce. The surface-active agent, when used, normally comprises from 1–15 percent by weight of the composition.

It is apparent that modifications may be made in the formulation and application of the compositions of this invention, without departing from the novel concept herein, as defined in the following claims:

We claim:

1. Fungicidal composition which comprises (a) a fungicidally effective amount of a phenyl-azoalkenoate of the formula

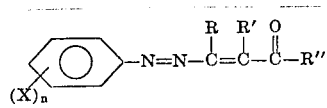

wherein R is hydrogen or alkyl of 1 - 3 carbon atoms; R' is hydrogen or chlorine; R''is alkoxy of 1 - 4 carbon atoms, methylamino, or dimethylamino; X is in the ortho or para position and is nitro, cyano, methylsulfonyl, carbosyl, or the potassium or triethylamine salt of carbosyl; and n is 1 or 2; (b) an inert fungicidal carrier; and (c) a surface active agent.

2. Composition of claim 1 wherein R''is methoxy or ethoxy; n is 1, and X is in the paraposition.

3. Composition of claim 2 wherein R' is hydrogen.

4. Composition of claim 3 wherein X is nitro or cyano, methylsulfonyl, carboxyl, or -COOM where M is a metal cation or a quaternary amine.

5. Composition of claim 4 wherein R is hydrogen or methyl.

6. Composition of claim 1 wherein the compound is methyl 3-[(p-nitrophenyl)azo]-2-butenoate.

7. Composition of claim 1 wherein the compound is methyl 3-[(p-cyanophenyl)azo]-2-butenoate.

8. Composition of claim 1 wherein the compound is N,N-dimethyl-3-[(p-nitrophenyl)azo]-2-butenamide.

9. The method fo combating plant-infesting fungal organisms which comprises applying to the situs of plants a fungicidally effective amount of a phenylazoalkenoate of the formula

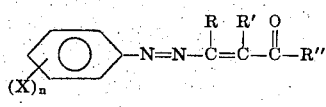

wherein R is hydrogen or alkyl of 1 - 3 carbon atoms; R' is hydrogen or chlorine; R'' is alkoxy of 1 - 4 carbon atoms, methylamino, or dimethylamino; X is in the ortho or para position and is nitro, cyano, methylsulfonyl, carboxyl, or the potassium or triethylamine salt of carbosyl; and n is 1 or 2.

10. The method of claim 9 wherein R'' is methoxy or ethoxy; n is 1, and X is in the para position.

11. The method of claim 10 wherein R' is hydrogen.

12. The method of claim 11 wherein X is nitro or cyano.

13. The method of claim 12 wherein R is hydrogen or methyl.

14. The method of claim 9 wherein the compound is methyl 3-[(p-nitrophenyl)azo]-2-butenoate.

15. The method of claim 9 wherein the compound is methyl 3-[(p-cyanophenyl)azo]-2-butenoate.

16. The method of claim 9 wherein the compound is N,N-dimethyl-3-[(p-nitropenyl)azo]-2-butenamide.

* * * * *

UNITED STATES PATENT OFFICE
CERTIFICATE OF CORRECTION

Patent No. 3,715,435          Dated February 6, 1973

Inventor(s) Wayne N. Harnish, Robert E. Sticker, Glen A. Carls

It is certified that error appears in the above-identified patent and that said Letters Patent are hereby corrected as shown below:

Column 3, line 5, "85°-85°/21-22" should read
-- 83°-85°/21-22 --; line 23, "CiiHiiN₃O₄" should read
-- $C_{11}H_{11}N_3O_4$ --; lines 60 to 65, in headings of Table 1

"Rating Standard
                              Test     Rating     Identity
                Compound                                    "

should read      --      Rating                Standard         --
                    Test Compound     Rating    Identity Column 4, line 32, "is 350 ml" should read -- in 350 ml --;
line 47 "17±1'" should read -- 17±1° --.
Column 6, line 21, "olyram" should read -- Polyram --;
line 45, "befebinapacryl" should read -- binapacryl --;
line 60, "1001 terminals" should read -- 100 terminals --.
Column 7, line 35, "(MhSO₄)" should read -- (MgSO₄) --.
Column 10, line 6, "Found: C 54.56" should read
-- Found: C 54.46; --; line 24, "organe" should read -- orange--;
line 28, "C-H₁₆N₂O₄S" should read -- $C_{13}H_{16}N_2O_4S$ --.
Column 11, line 9, "did not" should read -- but did not---;
line 31, "$C_{12}H_{14}H_2O_4S$" should read -- $C_{12}H_{14}N_2O_4S$ --;
line 37, "oryzse" should read -- oryzae --; line 49, "5.0 g"
should read -- 5.9 g --; line 61, "H 4.86" should read
-- H 4.87 --.
Column 12, line 9, "roange" should read -- orange --; line 10,
"alst" should read -- salt --; line 59, "mp = 78°-81°"
should read -- mp = 79°-81° --.

UNITED STATES PATENT OFFICE
CERTIFICATE OF CORRECTION

Patent No. 3,715,435        Dated February 6, 1973

Inventor(s) Wayne N. Harnish, Robert E. Sticker, Glen A. Carls

It is certified that error appears in the above-identified patent and that said Letters Patent are hereby corrected as shown below:

Column 13, line 31, "chlorofirmhexane" should read -- chloroform-hexane --.
Column 16, line 55, "carbosyl" should read -- carboxyl --; line 56, "carbosyl" should read -- carboxyl --; lines 61, to 65, claim 4, "wherein X is nitro or cyano, methylsulfonyl, carboxyl, or -COOM where M is a metal cation or a quaternary amine" should read -- wherein X is nitro or cyano, --.
Column 18, line 3, "carbosyl" should read -- carboxyl --.

Signed and sealed this 15th day of April 1975.

(SEAL)
Attest:

RUTH C. MASON
Attesting Officer

C. MARSHALL DANN
Commissioner of Patents
and Trademarks